United States Patent [11] 3,607,492

[72] Inventors Donald George Keith
 Mount Eliza;
 Donald Robert Burch, Forest Hill, both of Australia
[21] Appl. No. 776,731
[22] Filed Nov. 18, 1968
[45] Patented Sept. 21, 1971
[73] Assignee Imperial Chemical Industries of Australia and New Zealand Limited
 Melbourne, Victoria, Australia

[54] PROCESS FOR PREPARING COMPOSITE TUBE
 20 Claims, 7 Drawing Figs.
[52] U.S. Cl. .................................................... 156/79, 156/149, 156/187
[51] Int. Cl. .................................................... B32b 31/00
[50] Field of Search ........................................ 156/79, 149, 172, 187

[56] References Cited
 UNITED STATES PATENTS
 2,797,731  7/1957  Carlson, Jr. ............... 156/187
 3,366,719  1/1968  Lueders ..................... 156/79 X
 3,399,095  8/1968  Hyland, Jr. ................ 156/79

Primary Examiner—Benjamin R. Padgett
Assistant Examiner—S. R. Hellman
Attorney—Cushman, Darby & Cushman ABSTRACT: A process for the manufacture of composite tubes which may be multiwalled which comprises the steps of (a) rotating a tube having a wall thickness small in relation to its overall diameter around its longitudinal axis, (b) moving a ribbon of flexible material past foam-dispensing means and depositing a layer of nascent foam upon one face of the said ribbon, (c) feeding the said coated ribbon tangentially onto the rotating tube at an angle to the longitudinal axis of the tube such that the said coated ribbon forms a spirally wound envelope around the tube and (d) causing or allowing the foam to expand and cure.

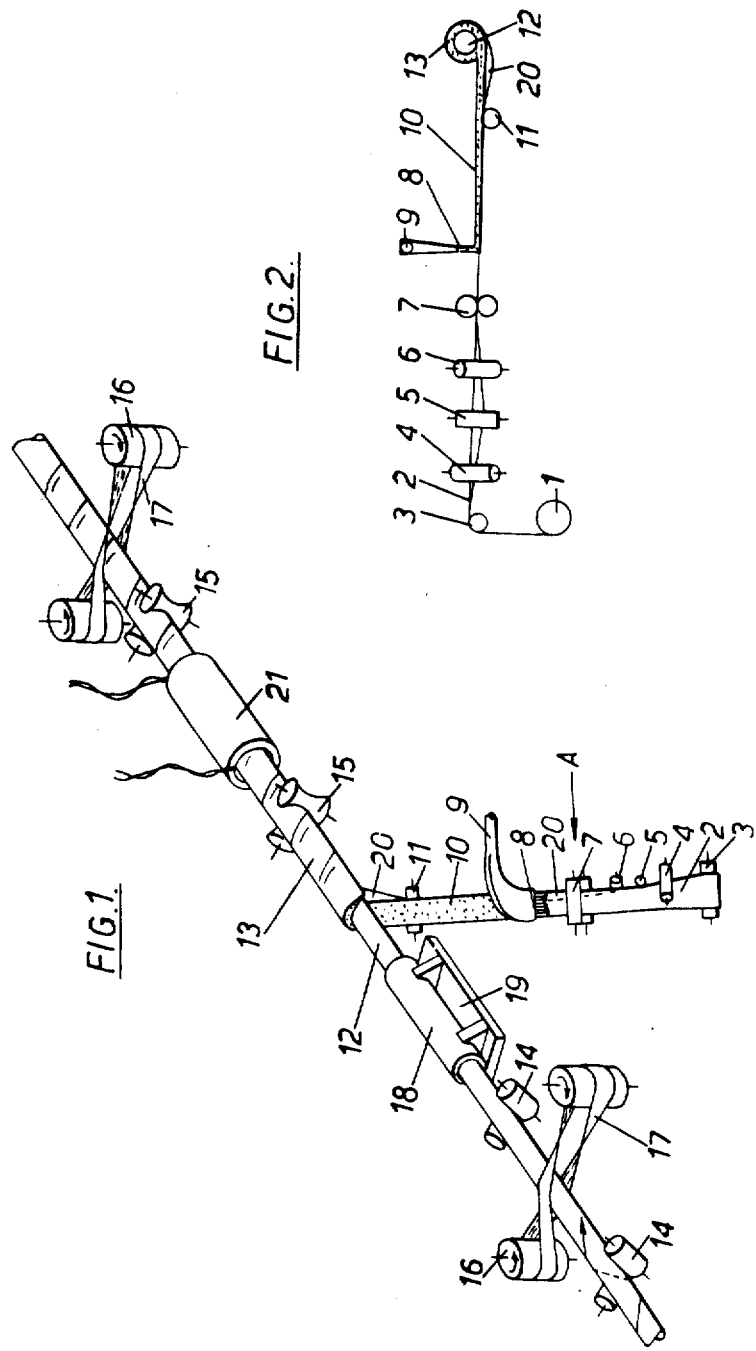

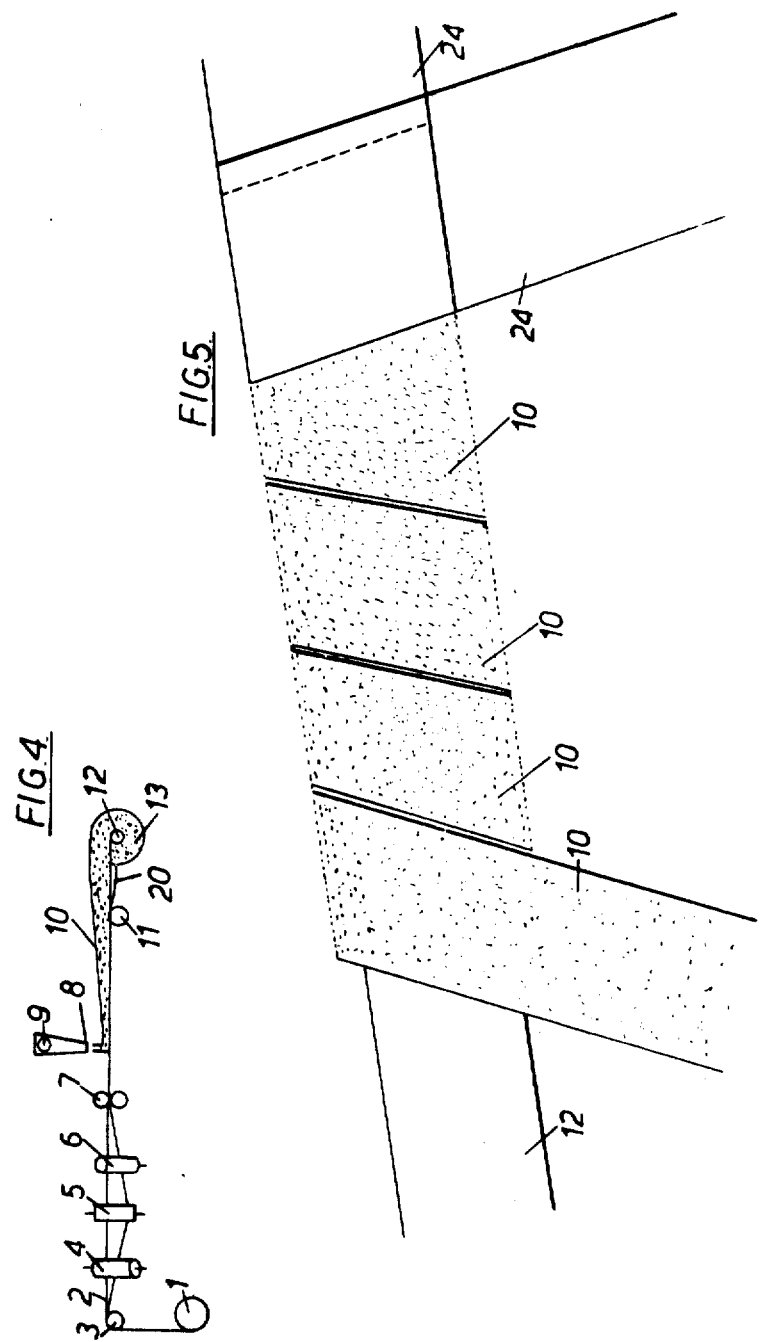

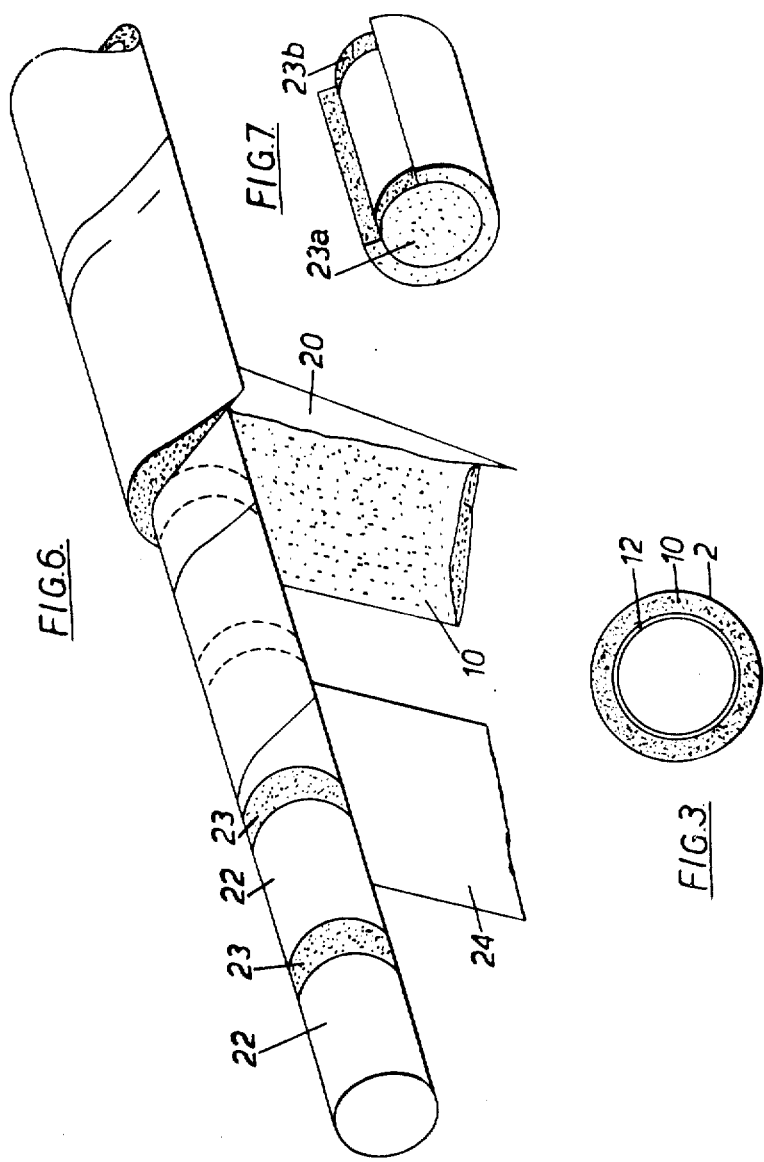

PROCESS FOR PREPARING COMPOSITE TUBE

This invention relates to composite tubes, in particular to composite plastic tubes and to a process of manufacture of said composite tubes.

The manufacture of composite tubes comprising at least one layer of plastic foam has already been proposed e.g. in Australian Pat. No. 240521 and in U.S. Pat. application Ser. No. 508,349, filed Nov. 17, 1965. Processes for the manufacture of spiral pipes from strip metal or paper strips are also known e.g. from Australian Pat. Nos. 122399, 144302, 212720 and 220568. These processes permit the continuous manufacture of endless spirally wound pipes consisting of metal, paper or cardboard or similar strips of flexible material.

Plastic pipes are a desirable alternative to concrete pipes, but at comparable compression strengths the wall thickness of the plastic pipe is so large that the cost of the plastic pipe is prohibitive.

The prior art technique of making composite pipes by direct deposition of foam on to a rotating pipe is really more suitable for large diameter pipes, where slight variations in overall diameter are not critical, than for small pipes because the evenness of the foam layer and its thickness are difficult to control. Also, widely used existing spray equipment designed for depositing foam on to a moving belt of paper is not suitable.

We have now conceived a process of depositing nascent foam on to a ribbon substrate and converting said coated substrate into an annular layer of foam surrounding a tube, which process produces evenly foam-coated tubes and permits the use of existing foam-spraying equipment.

Accordingly we provide a process for the manufacture of composite tubes which comprises the steps of (a) rotating a rigid or self-supporting flexible tube having a wall thickness small in relation to its overall diameter around its longitudinal axis and moving said tube along its longitudinal axis, (b) moving a ribbon of flexible material past foam-dispensing means and depositing a layer of nascent foam upon one face of the said ribbon, (c) feeding the said coated ribbon tangentially on to said rotating tube at an angle to the longitudinal axis of said tube such that the said coated ribbon forms a spirally wound envelope around said tube, and (d) causing or allowing the foam to expand and cure, optionally under the influence of heat.

The coated ribbon may be spirally wound around the rotating tube in either of two ways. In the first of these two ways, it is fed tangentially to the rotating tube in such a way that the coated face of the ribbon is adjacent the tube and the ribbon forms a spirally wound envelope which is external both to the tube and to the foam which is thus contained in the annulus between the tube and the spirally wound ribbon. In the second of these two ways, the coated ribbon is fed tangentially to the rotating tube in such a way that the uncoated face of the ribbon is adjacent to the tube and the foaming composition is external both to the tube and to the spirally wound ribbon upon which it expands; in this case, a second ribbon may be fed tangentially to the foam-coated rotating tube to form a spirally wound envelope around the foam which is thus contained in the annulus between the two ribbons. The invention is hereinafter primarily described with reference to the first of the two ways, but, as will become apparent, the second of these two ways may equally well be employed in the invention.

The techniques of spirally winding ribbon to form paper tubes are known; it is, however, surprising that evenly spaced, fairly concentrical and smoothly shaped envelopes can be obtained from a deposit of a fluid or gelatinous mass of expanding foam on the ribbon. Referring primarily to the first of the above-mentioned ways of spirally winding the coated ribbon around the rotating tube, we find that smooth envelopes may be formed particularly where the flexible material is expandible as e.g. crepe paper or stretchable plastic films, and the expansion of the foam is not completed until the coated ribbon has formed at least part of a convolution round the tube. In this way, the radial force of the expansion of the foam in the annulus between the tube and the ribbon evenly stretches the expandible film and the opposing tensile strength of the film cooperates to produce an even distribution of the foam in the annulus.

For the above and other reasons, it is preferred that the expansion of the foam is still incomplete at the point at which the coated ribbon contacts the tube. For example, the continued expansion of the foam thereafter may aid the production of good bonds between adjacent convolutions of foam. As a further aid to good bonding, it is also preferred that in the case where the structural component of the nascent foam composition is a cross-linkable e.g. thermosetting polymeric material, cross linking is not completed until at least one convolution of the coated ribbon round the tube has been achieved.

Although desirable for the above reasons, it is not necessary that the ribbon be of expandible material; for example it may be of cardboard or metal foil. It may also be a laminate, if desired, e.g. of paper and a polymeric material. The inner tube may be made of any self-supporting material e.g. metal, wood or plastics, but a plastics material is particularly preferred as the rigid foam e.g. a polyurethane foam envelope suitably complements the properties of the plastics tube. Suitable plastic materials for the tube are e.g. polyvinyl chloride, polyethylene, polypropylene and polystyrene. The ratio of wall thickness to diameter of the tube is not critical; as a rule it ranges from 1:100 to 1:3. Suitable foams are defined below; polyurethanes are preferred.

One way of carrying out the present invention comprises feeding the ribbon on to the rotating tube at an angle such that successive convolutions of the ribbon do not overlap but abut each other or are closely adjacent to each other, leaving virtually no gaps between them. This may be achieved when the equation:

$P\sin\alpha = W$ is satisfied, where $P$ is the pitch of the spiral (that is, the distance advanced by the rotating tube in one revolution), $\alpha$ is the angle between the longitudinal axis of the ribbon and the longitudinal axis of the rotating tube, and $W$ is the width of the ribbon.

Another method of operating our process comprises feeding the ribbon on to the rotating tube at an angle such that successive convolutions of the ribbon overlap partly at their edges. With this technique, a portion of the foam tends to exude at the line of overlap and, usually, must be removed by means of a knife or a wiping mechanism. To overcome this inconvenience it is desirable to leave one edge of the ribbon uncoated and to use this uncoated edge or selvedge of the ribbon to overlap the preceding convolution of the ribbon, so that substantially no foam is present between the overlapping edges of successive convolutions of the ribbon. One method of overcoming this is to arrange for the width of the orifice of the nascent foam dispensing means to be less than the width of the ribbon or, where the foam-dispensing means traverses across the face of the ribbon, arranging for the traverse to stop short of one edge of the ribbon. Another method of providing such an uncoated selvedge on the ribbon is provided by one embodiment of this invention which comprises the steps of rotating a self-supporting tube having a wall thickness small in relation to its overall diameter around its longitudinal axis and moving said tube along its longitudinal axis; dispensing continuously a ribbon of flexible material; forming an edge strip along one side of the ribbon by folding its edge back on to itself through at least 90° so that the edge strip comes to lie below the remaining width of the ribbon; moving the ribbon past foam-dispensing means and depositing a layer of nascent foam on the remaining width of the ribbon, leaving the folded back edge strip uncoated; feeding the ribbon tangentially on to the rotating tube at an angle $\alpha$ such that $P\sin\alpha$ is substantially equal to $W-w$ where $W$ is the overall width of the ribbon and $w$ is the width of the folded back edge strip; unfolding the uncoated folded back edge strip during its transit from the foam-dispensing means on to the rotating tube so that the ribbon reassumes its full width and so that the edge strip, free from foam, partly overlaps the internally coated preceding convolution of the ribbon, thereby forming a neatly jointed spirally wound envelope free from exuded foam around said tube; and causing or allowing the foam to expand and cure, optionally under the influence of heat.

The width of the ribbon of flexible material is not critical; conveniently it may be between 3 times to one-half the diameter of the tube; wider ribbon may be used advantageously when the inner tube rotates slowly and when the available foam-dispensing nozzle has a wide spray pattern, but wide ribbons are somewhat more difficult to feed evenly on to the tube; narrower ribbons, while feasible, require fast rotation of the tube and waste plastic foam owing to overspray on either side of the ribbon.

Where the expansion of the foam is incomplete at the point at which the coated ribbon comes into contact with the tube, the degree of expandability of the ribbon preferably is chosen carefully to match the expansion of the foam in the period between the formation of the first convolution and the completion of the expansion; thick layers of foam require greater expandability. However, expandability of the ribbon is not absolutely necessary as a degree of compression of the foam can be tolerated and expansion of the foam can be matched by the length of the ribbon fed.

The inner tube need not necessarily be prefabricated; as there are commercially available rotating plastic extruders the process of this invention may be synchronized with the process of extruding a rotating plastic pipe by means of a rotary extruder.

Furthermore the inner tube may be made up of individual units, preferably cylinders, preassembled and held together to form a tube. Accordingly we also provide a process characterized in that the inner tube is made up from individual cylinders linked to form a tube. In particular the cylindrical units may be containers such as tins or cans, optionally separated from each other by cylindrical units of packing material, all of said cylindrical units having approximately the same diameter and linked along their common axis to form one tube joined together e.g. by means of an outer envelope, e.g. plastic or paper wrapping. This form of preassembly of cylindrical cans, in one preferred embodiment of the invention, is shown in FIG. 6 as described below. The tube is then foam coated as above described and the complete and cured composite tube may be cut up into cylindrical sections of one tin each by cutting through said cylindrical packing unit. Thus e.g. there may be obtained a tin fully insulated by a mantle of polyurethane foam, a cylindrical top and a cylindrical bottom consisting of packing material, preferably polyurethane foam, and having a paper envelope between the polyurethane mantle and the tin which permits easy removal of the tin from its insulating packing.

Accordingly this invention also provides a method of packaging cylindrical containers of substantially the same diameter (for example, tins) which comprises concentrically assembling said containers (optionally separated by cylindrical packaging cushions of substantially the same diameter and preferably consisting of polyurethane foam) into a tubelike structure, holding the assembly together in tubular form by means of a sheet envelope, (for example a paper or plastics envelope) wrapped around the assembly, and forming an outer annulus of foam around the assembly in accordance with the above-described process. The formed and cured composite tube is subsequently divided up into cylindrical sections, each containing one cylindrical container, by cutting through the foam layer and, where used, the cylindrical packaging cushions, in between the ends of adjacent containers.

We also provide a machine for forming a composite tube as described which machine comprises, in combination: a frame supporting the machine components; driving means for moving a rigid or self-supporting flexible tube continuously along its longitudinal axis; means for rotating said tube during its travel in synchronization with, and optionally combined with, said driving means; supporting means for said tube; means for continuously delivering a ribbon of flexible, preferably expandable, material; optionally supporting means for said ribbon; optionally, tensioning means for said ribbon; means for guiding said ribbon tangentially on to said rotating tube at a predeterminable angle less than 90° to the axis of rotation of said tube; means for depositing and distributing a controllable width and quantity of a foaming composition on to the moving ribbon; optionally, means for pressing the coated ribbon on to and around the rotating tube; guiding means for the composite tube so obtained; optionally, heating means for said composite tube; and, optionally, auxiliary driving, axially advancing and rotating means at the delivery end of said composite tube.

In a preferred form of the apparatus, the latter comprises, in addition, means for turning one edge of the ribbon through at least 90° C. back on to its underside, said means being positioned between the ribbon-delivering means and the foam-depositing means. In addition, optionally, a flying saw is used moving forward in a synchronized manner at the speed of and parallel to the longitudinal travel of said finished tube and rapidly moving back to a predeterminable position and capable of cutting said tube into sections.

Preferred foams are those based on cross-linkable polymer systems, e.g. polyurethanes and formaldehyde-based resins e.g. phenol formaldehyde, urea formaldehyde and melamine formaldehyde resins.

The preferred plastics materials of our invention are foamable polyurethanes and the preferred techniques of foaming are the known processes of producing polyurethane foams.

By "polyurethanes" we mean the materials produced by the interaction of organic polyisocyanates with hydroxyl group-containing polymers for example polyesters, polyesteramides and polyethers modified for example by the addition of water in order to produce blown, cellular materials.

In the case of foamed polyurethane materials, one available method consists in reacting the hydroxyl group-containing polymer in a single stage process with the organic polyisocyanate and water, if necessary in the presence of catalysts, surface active agents or other auxiliary agents, whereby simultaneous interaction between the isocyanate, water and the hydroxyl group-containing polymer takes place to give a foamed product. Alternatively, the hydroxyl group-containing polymer may be reacted with sufficient polyisocyanate to give an intermediate reaction product containing isocyanate groups, and this product may then be reacted with water, if desired in the presence of catalysts, surface active agents or other auxiliary agents, in order to produce the final foamed product.

The starting materials to be used in the process of the present invention are those more fully described in the prior art relating to the manufacture of polyurethanes.

Suitable polyisocyanates include hexamethylene diisocyanate, tolylene-2:4- and 2:6-diisocyanates, diphenylmethane-4:4'-diisocyanate, 3-methyl-diphenylmethane-4:4'-diisocyanate, m- and p-phenylene diisocyanates, chlorophenylene-2:4-diisocyanate and dicyclohexylmethane triisocyanates and higher polyisocyanates which may be used include 2:4:6-triisocyanatotolylene, 2:4:4'-triisocyanatodiphenyl-ether and polymers of tolylene-2:4 and 2:6-diisocyanates. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine The hydroxy group-containing polymer may be, for example, a polyester, polyesteramide or polyether.

The polyesters or polyesteramides are made from dicarboxylic acids and glycols, and, as necessary, diamines or aminoalcohols. Suitable dicarboxylic acids include succinic, glutaric, suberic, adipic, azelaic, and sebacic acids as well as aromatic acids such as phthalic, isophthalic and terephthalic acids. Mixtures of acids may be used. Examples of glycols are ethylene glycol, 1:2-propylene glycol, 1:3-butylene glycol, diethylene glycol, trimethylene glycol, tetramethylene glycol, pentamethylene glycol, hexamethylene glycol, decamethylene glycol and 2:2-dimethyltrimethylene glycol. Mixtures of glycols may be used and polyhydric alcohols, such as trimethylolpropane, pentaerythritol or glycerol, may be included in varying amounts according to the desired rigidity of the products. Examples of diamines and aminoalcohols include ethylene diamino, hexamethylene diamine, monoethanolamine, phenylene diamines and benzidine.

As examples of polyethers for use in the process of the present invention there may be mentioned hydroxyl-ended polymers and copolymers of cyclic ethers and especially of ethylene oxide, epichlorhydrin, 1:2-propylene oxide, 1:2-butylene oxide or other alkylene oxides, oxacyclobutane and substituted oxacyclobutanes and tetrahydrofuran. Such polyethers may be linear polyethers as are prepared, for example, by the polymerisation of an alkylene oxide in the presence of a glycol initiator. Alternatively there may be used branched polyethers prepared for example by polymerising an alkylene oxide in the presence of a substance having more than two active hydrogen atoms, for example glycerol, pentaerythritol and ethylene diamine. Mixtures of linear and branched polyethers or mixtures of polyesters and polyethers may be used if desired.

The interaction between the polyisocyanate, the hydroxyl-containing material and any water employed may be carried out in a continuous or discontinuous manner using prior art methods. The interaction may be modified if desired by the incorporation of other ingredients and known adjuvants, including other catalysts either of a basic nature for example dimethylcyclohexylamine, triethylamine, dimethylbenzylamine, N-methylmorpholine, tetramethylguanidine, triethylenediamine, 4-dimethylaminopyridine, potassium carbonate, potassium acetate, potassium naphthenate, basic lead acetate or nonbasic metal catalysts such as lead carboxylates, zinc or lead dialkyl dithiophosphate, acetylacetonates of the transition elements and other metals and tin compounds, for example di-n-butyl tin dilaurate and stannous octoate, nonionic surface-active agents, salts of sulfuric acid derivatives of high molecular weight organic compounds, silicone oils, for example alkyl and aryl polysiloxanes and copolymers thereof with alkylene oxides, foam stabilizing agents, for example ethyl cellulose, low molecular weight polyhydroxy compounds such as trimethylolpropane, coloring matters, plasticisers, for example dialkyl phthalates, fire-proofing agents for example tri-($\beta$-chloroethyl) phosphate or antimony compounds, antioxidants and "blowing agents" such as volatile fluoroalkanes or mixtures thereof.

Our process is applicable to the manufacture of flexible and rigid foam linings, but rigid foams are preferred.

Another preferred plastic foaming composition suitable for this invention are the compositions comprising at least one polymerisable vinyl ether containing at least two vinyl groups per molecule, a foaming agent and an acidic catalyst as described in British Patent No. 991,970 and U.S. Pat. Nos: 3,311,573, 3,311,574, and 3,311,575.

One embodiment of our invention is illustrated by FIGS. 1, 2 and 3 of the accompanying drawings, wherein:

FIG. 1 is an isometric schematic sketch of the machine;

FIG. 2 is a schematic sketch viewed from the direction of arrow A where the parts are numbered as described for FIG. 1; and FIG. 3 is a cross section through a composite tube according to this invention where the parts are numbered as described for FIG. 1.

An alternative embodiment of our invention is illustrated in FIGS. 4 and 5, wherein:

FIG. 4 is a schematic sketch similar to FIG. 2 from which it differs only in that the coated ribbon is wound around the tube with its coated face outerward; and FIG. 5 is an isometric fragmentary schematic sketch showing how the tube formed in FIG. 4 is completed by winding a second ribbon therearound.

A further embodiment of our invention is described and illustrated in FIGS. 6 and 7.

FIG. 6 is an isometric fragmentary schematic sketch of an alternative version of part of FIG. 1;

FIG. 7 is a fragmentary cross section of FIG. 6 with a partly exposed interior view. None of the figures is true to scale.

In FIGS. 1 and/or 2 respectively, numeral 1 indicates the roll of substrate-ribbon on which the ribbon is stored and from which it is delivered; 2 is the ribbon being fed in the direction of the arrow; 3 is an idling roller over which the ribbon passes; 4 and 6 are offset rollers inclined at angles to the direction of travel of the ribbon; 5 is a roller with its longitudinal axis perpendicular to the direction of travel of the ribbon and with its circumference touching the edge of the ribbon, thus compressing it somewhat. The action of rollers 4, 5 and 6 is such that a portion of the strip, by suitable roller adjustment, can be caused to fold back under itself, prior to passing between two nip rollers 7 which complete the folding back of the edge strip and tension and guide the ribbon beneath the foam distributor nozzle 8. The distributor nozzle 8 is attached to a foam dispensing apparatus not shown and connected to feed tube 9. 10 is the deposited foaming mixture and the position of the distributor nozzle 8 may be adjusted vertically and longitudinally relative to the direction of movement of the strip by moving a mounting not shown attached to the dispensing tube 9. The coated ribbon passes over an idling roller 11, the uncoated edge strip 20 unfolds itself at this point and the whole ribbon passes around a plastic tube 12 to form a composite plastic tube 13 of regular annular cross section. The angle $\alpha$ between the ribbon 2 and the axis of tube 12 is such that $P \sin \alpha = W-w$ where $P, W$ and $w$ have the meanings defined above. The edge strip 20 shown near 11 and as a dotted line between roller 5 and nozzle 8, overlaps with the preceding convolution of the outside of the coated edge of ribbon 2. The plastic tube is supported by means of rollers 14. Each group of rollers 14 consists of three rollers, spaced at angles of 120° from each other around the tube, one of which rollers out of each group of three is not shown, so that the tube is thereby firmly guided. Optionally these rollers may be driven at a speed synchronized with the movement of the ribbon 2. The tilt of the axis of rotation of said rollers minimizes friction. A sleeve 18 mounted firmly on a platform 19 is interposed between the last set of rollers 14 and the point where the coated substrate is fed tangentially to the plastic tube. This sleeve 18, preferably internally coated with polytetrafluoroethylene so as to minimize friction, acts as an additional guide and support for the plastic tube prior to application of the coated substrate. The rotation and longitudinal movement of the plastic pipe both prior and subsequent to the application of the substrate is provided by friction belts 17 driven by motors and drives not shown, connected to pulleys 16. The rotational movement of the tube is utilized to draw the ribbon 2, tensioned by nip rollers 7 onto the tube. Subsequent to the application of the substrate the composite tube is guided through further groups of three rollers 15 spaced at angles of 120° from each other around the tube, one of which rollers out of each group of three is not shown, so that the composite tube is thereby firmly guided. The tilt of the axes of rotation of said rollers and their curved surface minimize friction and minimize damage to the coated substrate and assist in smoothing out any unevenness. Around the tube there are several circularly spaced electric heaters 21 for curing the foam.

In FIG. 3 numeral 12 indicates the inner tube, 10 is the annular foam layer and 2 is the outer envelope formed from the spirally wound flexible ribbon.

The alternative embodiment illustrated in FIGS. 4 and 5, merely shows that the coated ribbon 2 may be passed around the plastic tube 12 in the opposite sense from that shown in FIG. 2, namely with the uncoated face of the ribbon adjacent the tube 12 and its foamed face 10 facing outwards. This gives rise to the rotating foam-covered tube 12 shown in FIG. 5 (although it will be appreciated that the foam-covered convolutions 10 will not be sharply demarcated from each other as shown in the FIG. 5; on the contrary, the expansion of the foam will cause the successive convolutions to merge until they are indistinguishable from one another). A second ribbon 24, which is conveniently the same as that used in the embodiment illustrated in FIGS. 1 to 3, may be spirally wound around the foam-covered tube 12 to provide a composite tube which is externally similar to that produced by the embodiment illustrated in FIGS. 1 to 3. It will also be appreciated that, whereas we have also shown the uncoated folded-back edge strip 20 in FIG. 4, this is not essential in the embodiment illustrated in FIGS. 4 and 5, since it is not necessary for successive convolutions of the ribbon 2 to overlap, though, of course, there should not be any substantial gap between them.

FIGS. 6 and 7 illustrate the use of this invention for the continuous packaging of tins in an insulating mantle of polyurethane foam. 22 are cylindrical tins preassembled concentrically into a tube equivalent to tube 12 in FIG. 1; 23 are cylindrical polyurethane cushions acting as insulation and packaging, which cushions are prefabricated to have approximately the same diameter as the tins; 24 is a flexible ribbon enveloping preassembled units 22 and 23 so as to form a self-supporting tube and also, after completion of the packaging process, so as to allow the tin to be easily removed from the polyurethane foam mantle; 10 and 13 have the meanings above defined.

FIG. 7 shows one fully packaged tin. It is made by cutting centrally through each cylindrical polyurethane cushion 23, preferably by means of a flying band saw, so as to form one lid 23a and one bottom 23b out of each cushion 23. The thin inner envelope 24, which may conveniently be of paper (not shown in the cutoff exposed section of FIG. 7) makes it easy to pull off lid 23a or bottom 23b and to slide the tin out of its mantle.

Alternatives to the means exemplified in our preferred embodiment of FIGS. 1 to 7 inclusive will be obvious to those skilled in the art. Thus driving means 16 and 17 may be replaced by driving wheels, e.g. by driving wheel 14 and/or 15 in a synchronized manner; hot air heaters may be used in place of electrical mantles 21; ribbon 2 may be folded back prior to mounting e.g. on reel 1; tube 12 need not be strictly circular, but may be oval or even irregular in cross section and nozzle 8 may be a reciprocating foam dispenser, as known in the art.

In operation according to the embodiment illustrated in FIGS. 1 to 3, a plastic tube 12 is rotated and simultaneously moved forward longitudinally by a friction belt 17 driven by pulleys 16 and is supported by rollers 14 and polytetrafluoroethylene-lined sleeve 18. Ribbon 2 is withdrawn by the rotary movement of tube 12 from dispensing roll 1, fed over idling roller 3, tilted by roller 4, laterally compressed slightly by roller 5 and an edge strip 20 is bent back onto the underside of ribbon 2 by roller 6 cooperating with nip rollers 7 which complete the folding back of edge strip 20, reposition the ribbon in the approximately horizontal plane, and tension the ribbon against the pull of the rotating tube. A foaming composition prepared in a mixing machine not shown is delivered through feed tube 9 and sprayed on to the ribbon from distributor nozzle 8. The deposited foam 10 slightly rises on transit past guiding roller 11; the foam-coated ribbon is wound helically around tube 12 in the manner described above, the composite tube supported by further rollers 15 which also assist in smoothing out unevenness and the foam is allowed to rise and is cured by means of heater 21. Withdrawal of the completed composite tube is aided by further driving and rotating means, friction belt 17. A flying saw, not shown, is used to cut the fully cured composite tube into desired lengths.

We claim:

1. A process for the manufacture of composite tubes which comprises the steps of (a) rotating a tube having a wall thickness small in relation to its overall diameter around its longitudinal axis, (b) moving a ribbon of flexible material past foam-dispensing means and depositing a layer of nascent foam upon one face of the said ribbon, (c) feeding the said coated ribbon tangentially on to the rotating tube at an angle to the longitudinal axis of the tube such that the said coated ribbon forms a spirally wound envelope around the tube and (d) causing or allowing the foam to expand and cure.

2. A process as claimed in claim 1, wherein the foam is allowed to expand and cure under the influence of heat.

3. A process as claimed in claim 1, wherein said tube is rigid.

4. A process as claimed in claim 1, wherein said tube is a self-supporting flexible tube.

5. A process as claimed in claim 1 wherein the ribbon of flexible material is crepe paper.

6. A process as claimed in claim 1, wherein the ribbon of flexible material is a plastics film.

7. A process as claimed in claim 1, wherein the nascent foam is a polyurethane foam.

8. A process as claimed in claim 1, in which the coated ribbon is fed tangentially on to the rotating tube with its coated face adjacent the tube, so that the foam is contained in the annulus between the tube and the spirally wound ribbon.

9. A process as claimed in claim 8, wherein the ribbon is fed on to the rotating tube at an angle such that successive convolutions of the ribbon do not overlap but abut each other or are closely adjacent to each other.

10. A process as claimed in claim 8 wherein the ribbon is fed on to the rotating tube at an angle such that successive convolutions of the ribbon overlap partly at their edges.

11. A process as claimed in claim 10, wherein said layer of nascent foam is deposited over substantially the whole width of said face of the said ribbon except that edge thereof which overlaps the preceding convolution of the ribbon, so that substantially no foam is present between the overlapping edges of successive convolutions of the ribbon.

12. A process as claimed in claim 11, which comprises the steps of (a) rotating a tube having a wall thickness small in relation to its overall diameter around its longitudinal axis and moving the said tube along its longitudinal axis, (b) dispensing continuously a ribbon of flexible material, (c) forming an edge strip along one side of the ribbon by folding its edge back on to itself through at least 90° so that the edge strip comes to lie below the remaining width of the ribbon, (d) moving the ribbon past foam-dispensing means and depositing a layer of nascent foam on the remaining width of the ribbon leaving the folded-back edge strip uncoated, (e) b feeding the ribbon tangentially on to the rotating tube at an angle $a$ such that $P\sin a$ is substantially equal to $W-w$ where $P$ is the distance the tube moves forward in one complete revolution, $W$ is the total width of the ribbon, and $w$ is the width of the folded-back edge strip, (f) unfolding the uncoated folded-back edge strip during its transit from the foam-dispensing means on to the rotating tube so that the ribbon reassumes its full width and so that the edge strip, free from foam, partly overlaps the internally coated preceding convolution of the ribbon, thereby forming a neatly jointed spirally wound envelope free from exuded foam around the tube, and (g) causing or allowing the foam to expand and cure.

13. A process as claimed in claim 1, in which said coated ribbon is fed on to the rotating tube with the uncoated face of the ribbon adjacent the tube and the foam-coated face of the ribbon facing outwardly.

14. A process as claimed in claim 13, wherein a second ribbon of flexible material is fed tangentially to the foam-coated rotating tube to form a spirally wound envelope around the foam, so that the foam is contained in the annulus between the two spirally wound ribbons.

15. A process as claimed in claim 14, wherein said second ribbon is fed tangentially to the foam-covered rotating tube at an angle such that successive convolutions of the ribbon do not overlap but abut each other or are closely adjacent to each other.

16. A process as claimed in claim 14, wherein said second ribbon is fed tangentially to the foam-covered rotating tube at an angle such that successive convolutions of the ribbon overlap partly at their edges.

17. A process as claimed in claim 1, wherein the tube which is rotated is made up of individual units preassembled and held together to form a tubelike structure.

18. A process as claimed in claim 1 in which it is arranged that the expansion of the foam is incomplete at the point at which the coated ribbon contacts the rotating tube.

19. A process as claimed in claim 1 in which the nascent foam is based on cross-linkable polymeric material and it is arranged that completion of cross linking is delayed until after one full convolution of the coated ribbon has been formed round the rotating tube.

20. A process according to claim 1 wherein said layer of nascent foam begins to expand when deposited on the face of said ribbon in step (b) and wherein expansion and curing of said foam are completed in step (d).